United States Patent
De Los Toyos Lopez et al.

(10) Patent No.: US 10,677,471 B2
(45) Date of Patent: Jun. 9, 2020

(54) ELECTRONIC THERMOSTAT FOR AN OVEN

(71) Applicant: Eika, S. Coop., Etxebarria (ES)

(72) Inventors: Daniel De Los Toyos Lopez, Eibar (ES); Agustin Etxebarrieta Alonso, Forua (ES)

(73) Assignee: EIKA, S. COOP., Etxebarria (ES)

( * ) Notice: Subject to any disclaimer, the term of this patent is extended or adjusted under 35 U.S.C. 154(b) by 308 days.

(21) Appl. No.: 15/868,442

(22) Filed: Jan. 11, 2018

(65) Prior Publication Data

US 2018/0142899 A1 May 24, 2018

Related U.S. Application Data

(63) Continuation of application No. PCT/ES2016/070533, filed on Jul. 14, 2016.

(30) Foreign Application Priority Data

Jul. 7, 2015 (ES) ............................... 201530835 U

(51) Int. Cl.
*F24C 7/08* (2006.01)
*H05B 1/02* (2006.01)
*G05D 23/19* (2006.01)

(52) U.S. Cl.
CPC .............. *F24C 7/081* (2013.01); *F24C 7/087* (2013.01); *G05D 23/1902* (2013.01); *H05B 1/0263* (2013.01)

(58) Field of Classification Search
CPC ........ H05B 1/0263; F24C 7/081; F24C 7/087; F24C 7/08
See application file for complete search history.

(56) References Cited

U.S. PATENT DOCUMENTS

| | | | |
|---|---|---|---|
| 4,035,787 A * | 7/1977 | Hornung ................ | A47J 37/00 432/36 |
| 4,252,270 A * | 2/1981 | Taylor ................... | G05D 23/275 165/253 |
| 4,377,346 A | 3/1983 | Beaver et al. | |

(Continued)

FOREIGN PATENT DOCUMENTS

WO 2017013290 A1 1/2017

OTHER PUBLICATIONS

International Search Report in corresponding International Application No. PCT/ES2016/070533, dated Oct. 27, 2016.

(Continued)

*Primary Examiner* — Brian W Jennison

(74) *Attorney, Agent, or Firm* — Edell, Shapiro & Finnan, LLC

(57) ABSTRACT

Electronic thermostat for an oven that includes a shaft with a first end suitable for being coupled to a rotary knob for modifying the temperature set point according to its angular position, and an electronic board with a potentiometer, a second end of the shaft being coupled to the potentiometer. The electronic thermostat includes a support having a base in which the electronic board is fixed, a side wall extending from the base, and a support wall extending from the base and arranged parallel to the side wall, the shaft going through the side wall and the support wall.

19 Claims, 4 Drawing Sheets

(56) References Cited

U.S. PATENT DOCUMENTS

| | | | | |
|---|---|---|---|---|
| 5,100,053 | A * | 3/1992 | Manson | G05D 23/1902 236/47 |
| 6,444,954 | B1 * | 9/2002 | Blankenship | A47J 37/0635 219/386 |
| 2003/0226903 | A1 | 12/2003 | Onishi et al. | |
| 2015/0168961 | A1 * | 6/2015 | Koopman | G05D 23/1902 700/300 |

OTHER PUBLICATIONS

International Preliminary Report on Patentability in corresponding International Application No. PCT/ES2016/070533, dated Jun. 22, 2017.

* cited by examiner

ELECTRONIC THERMOSTAT FOR AN OVEN

CROSS-REFERENCE TO RELATED APPLICATIONS

The present application relates to and claims the benefit and priority to International Application No. PCT/ES2016/070533, filed Jul. 14, 2016, which claims the benefit and priority to Spanish Application No. U 201530835, filed Jul. 17, 2015.

TECHNICAL FIELD

The present invention relates to an electronic thermostat for an oven, and more specifically to an electronic thermostat with temperature set point reading by means of a rotary knob.

BACKGROUND

Electromechanical thermostats are known to comprise a bulb sensing element containing a fluid capable of expanding and contracting due to temperature changes, causing the sudden actuation of a switch system connecting or disconnecting the heat source. Electromechanical thermostats of this type comprise a rotary knob with which the user can define the temperature set point, said knob establishing the activation point of the switch system.

On the other hand, electronic thermostats are known to comprise a set point reader and a temperature sensor measuring the oven temperature at all times. They compare by means of a controller the oven temperature and the set point temperature and the different heat sources of the oven are connected or disconnected depending on said comparison.

Electronic thermostats generally comprise a touch keyboard for entering the temperature set point, although electronic thermostats in which a rotary knob is used for introducing the temperature set point are also known. Document FR2714960A1, for example, discloses an electronic thermostat comprising a rotary knob coupled to an end of a shaft, the opposite end being coupled to a potentiometer.

SUMMARY OF THE DISCLOSURE

According to one embodiment an electronic thermostat is provided that comprises a shaft with a first end suitable for being coupled to a rotary knob for modifying the temperature set point according to its angular position, and an electronic board comprising a potentiometer, a second end of the shaft being coupled to said potentiometer.

The electronic thermostat further comprises a support comprising a base in which the electronic board is fixed, a side wall extending from one of the sides of the base, and a support wall extending from the base and arranged parallel to the side wall, the shaft going through the side wall and the support wall.

Ovens, as well as the elements forming them, must pass the tests defined in the EN-60350 standard in order for them to be sold on the market. The thermostat must also pass several tests which consist of applying different forces on the knob which is coupled to an end of the shaft of the thermostat. Since the shaft is coupled at the other end to the potentiometer, the forces applied on the knob must essentially be dampened without affecting the potentiometer as they may damage it. Both the side wall and the support wall of the electronic thermostat of the invention absorb said forces applied on the shaft and the potentiometer is therefore not affected.

On the other hand, the electronic thermostat of the invention is interchangeable with an electromechanical thermostat, such that it allows replacing the electromechanical thermostats of mechanical ovens in a simple manner. The control of a mechanical oven can thereby be improved by improving temperature control.

These and other advantages and features will become evident in view of the drawings and the detailed description.

DETAILED DESCRIPTION

Figure 1:
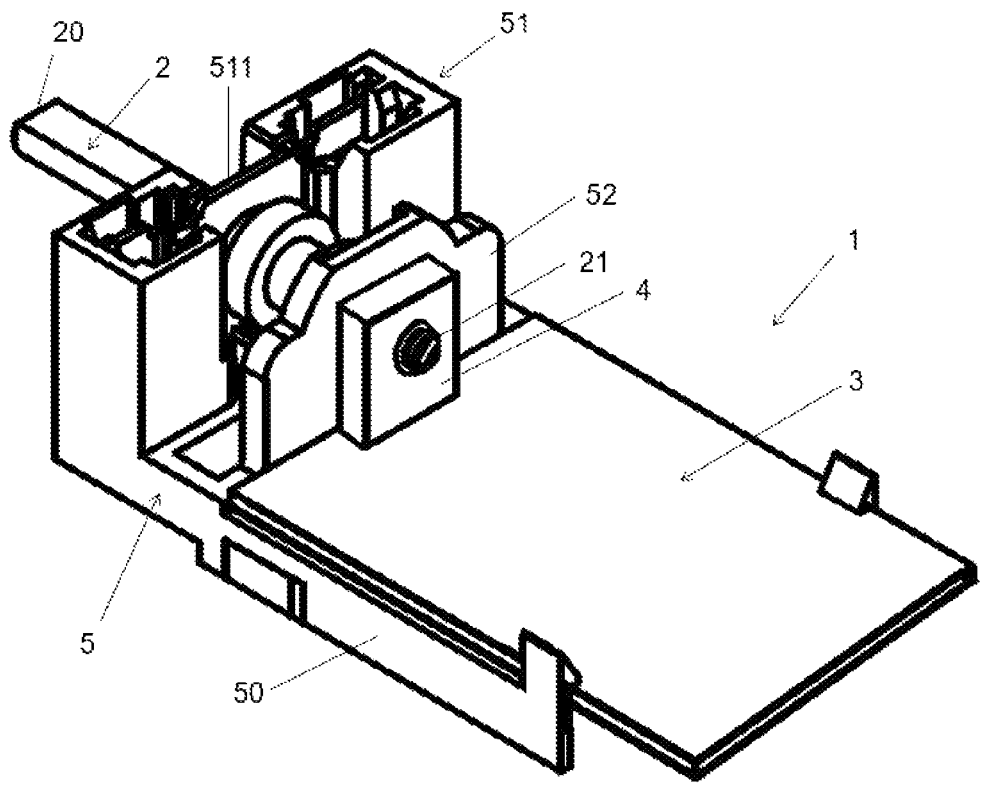
FIG. 1 shows a perspective view of an electronic thermostat according to one embodiment.
Figure 2:
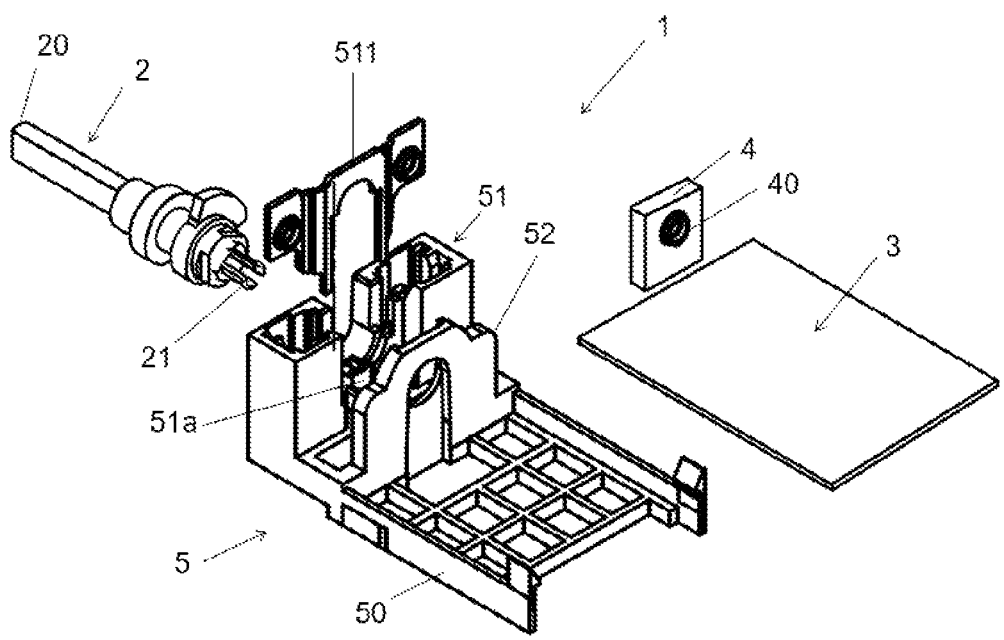
FIG. 2 is an exploded view of the electronic thermostat of FIG. 1.

FIGS. 1 and 2 show an electronic thermostat 1 for an oven according to one embodiment. The electronic thermostat 1 comprises a shaft 2 with a first end 20 suitable for being coupled to a rotary knob for modifying the temperature set point according to its angular position. When the electronic thermostat is arranged in an oven, the rotary knob projects from the knob panel of the oven. By turning the knob, turning at the same time the shaft coupled thereto, the user can modify the temperature set point to the set point at which they want the oven to work.

The electronic thermostat 1 comprises an electronic board 3 comprising a potentiometer 4. A second end 21 of the shaft 2 is coupled to the potentiometer 4, specifically in this embodiment the second end 21 of the shaft 2 is coupled to a wheel 40 of the potentiometer 4.

As is known by the person skilled in the art, a potentiometer comprises three terminals. The resistance between the side terminals is fixed, whereas the resistance between each side terminal and the central terminal can be changed depending on the rotation of the wheel of the potentiometer. Therefore, when the user turns the knob coupled to the shaft 2, which is in turn coupled to the wheel 40 of the potentiometer 4, they change the resistance of the potentiometer 4 between its side terminals and central terminal. With the change in the resistance, the electronic board 3 can thus calculate the temperature set point desired by the user. A potentiometer with a maximum rotation of 260 degrees is preferably used, the maximum resistance that can be reached between a side terminal and the central terminal, when the wheel rotates said 260 degrees, corresponding with the maximum oven temperature.

Figure 3:
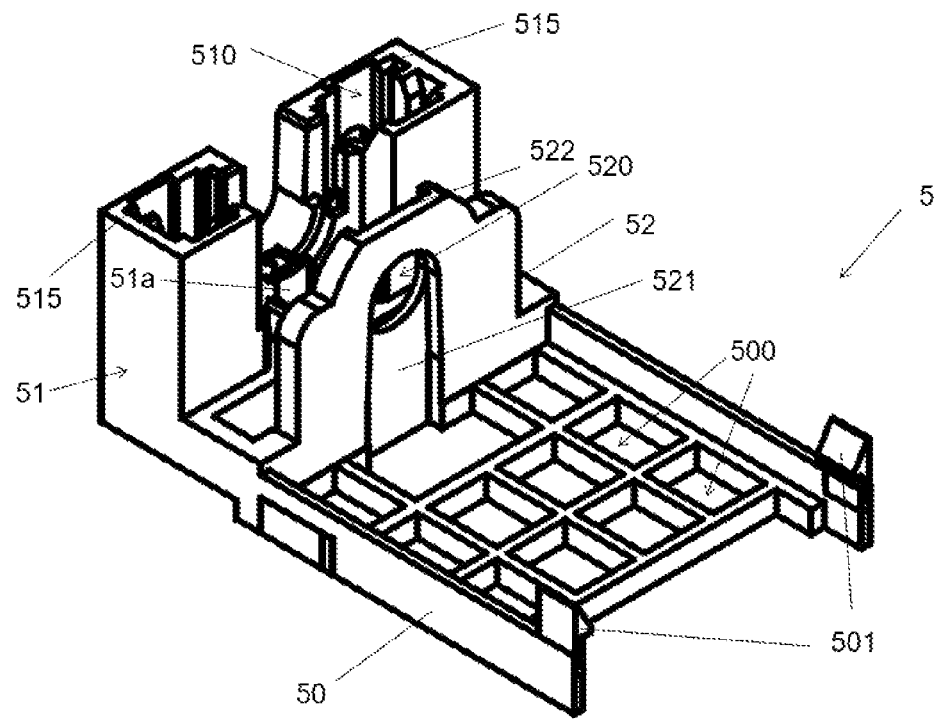
FIG. 3 is a perspective view of the support of the electronic thermostat of FIG. 1.
Figure 4:
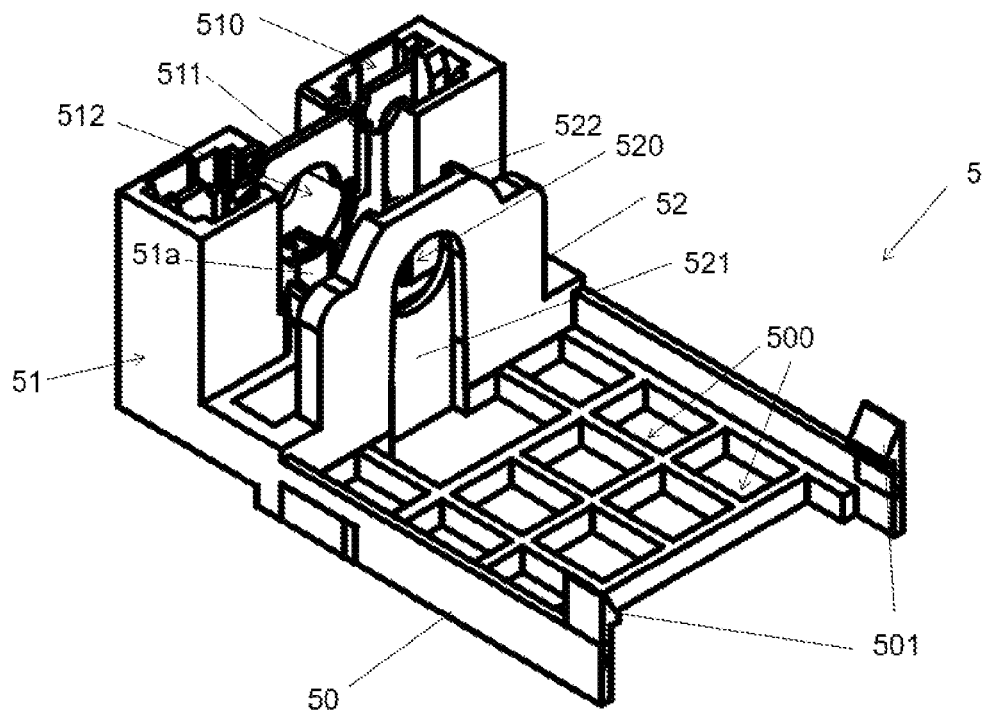
FIG. 4 is a perspective view of the support with the metal reinforcement of the electronic thermostat of FIG. 1.
Figure 5:
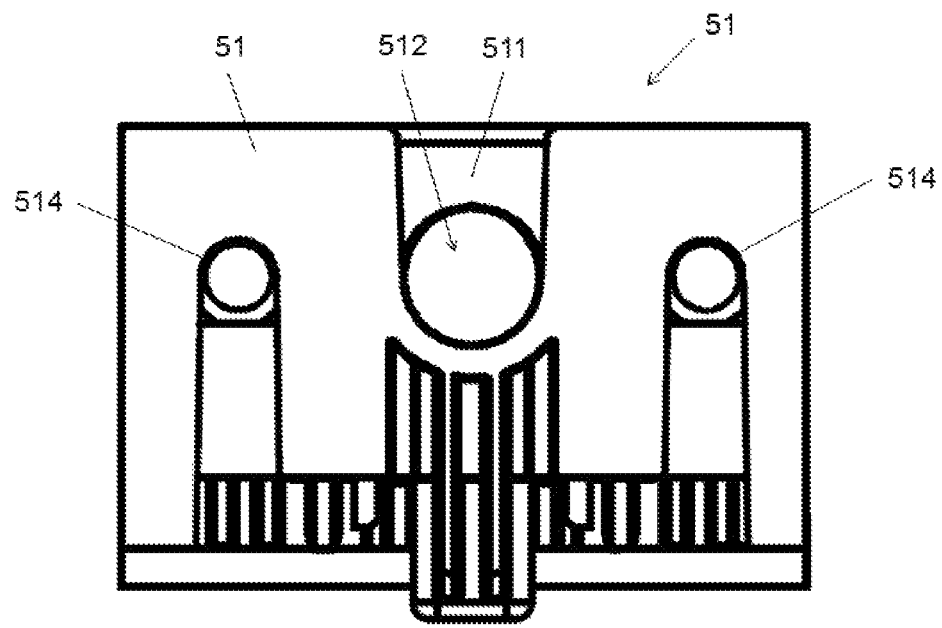
FIG. 5 is a front view of the support with the metal reinforcement of the electronic thermostat of FIG. 1.

The electronic thermostat 1 also comprises a support 5, shown in detail in FIGS. 3 to 5. The support 5 is preferably made of a plastic material, more preferably polyamide.

The support 5 comprises a base 50 in which the electronic board 3 is fixed. In this embodiment, both the base 50 of the support and the electronic board 3 have a rectangular shape.

In this embodiment, the base 50 comprises two flanges 501 retaining the electronic board 3. In other possible embodiments, the electronic board can be fixed to the base of the support in other ways known by the person skilled in the art, for example, by means of screws, rivets or plastically deformed metal flanges.

In this embodiment, the base 50 comprises a plurality of holes 500 allowing the passage of air for cooling the electronic board 3. This helps to cool the electronic board without adding additional elements such as radiators, for example.

The support comprises a side wall structure 51 having a side wall 51a that extends from the base 50 and a support wall 52 extending from the base 50 and arranged parallel to the side wall 51a. The shaft 2 goes through the side wall 51a and the support wall 52.

In this embodiment, the support wall 52 comprises a hole 520 with the shaft going through it. Furthermore, the side wall structure 51 comprises a housing 510 in which a metal reinforcement 511 is arranged, such that the side wall 51a and the metal reinforcement 511 demarcate a hole 512 with the shaft 2 going through it. The side wall structure 51 comprises in its housing 510 side guiding grooves 515 housing the side ends 511a and 511b of the metal reinforcement 511.

Both the side wall 51a and the support wall 52 absorb the different forces exerted on the rotary knob which is coupled to the shaft 2. There is therefore no risk of the potentiometer 4 being affected by said forces.

Figure 6:
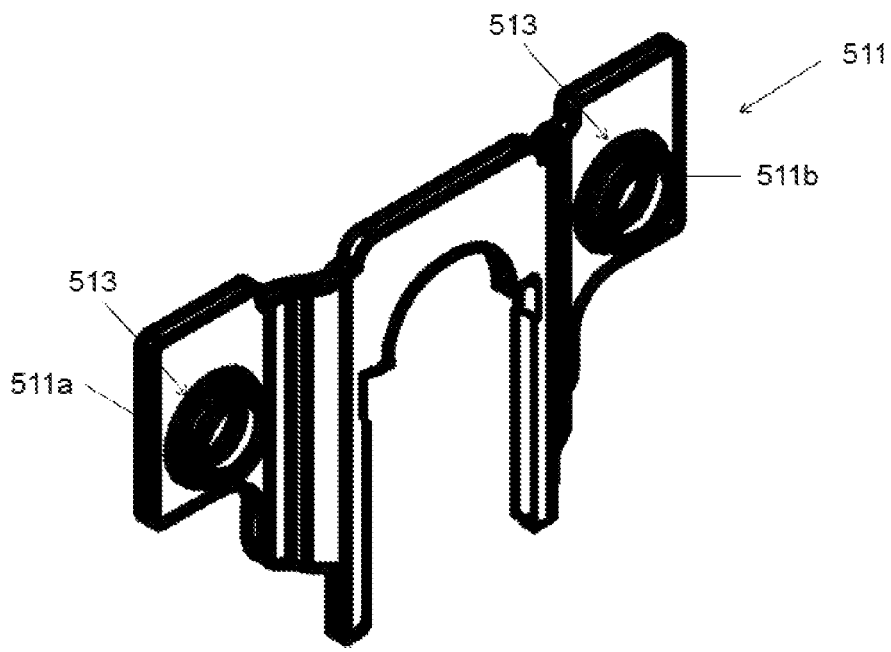
FIG. 6 is a perspective view of the metal reinforcement of the electronic thermostat of FIG. 1.

The metal reinforcement 511 of this embodiment, shown in detail in FIG. 6, comprises threaded holes 513 for fixing the electronic thermostat 1 to an oven. The side wall structure 51 further comprises on its outer face fixing holes 514 aligned with said threaded holes 513. The fact that the threaded holes are made in the metal reinforcement 511 improves the fixing of the electronic thermostat 1 to an oven, since the threaded holes which are made of a plastic material deform more easily.

Figure 7:
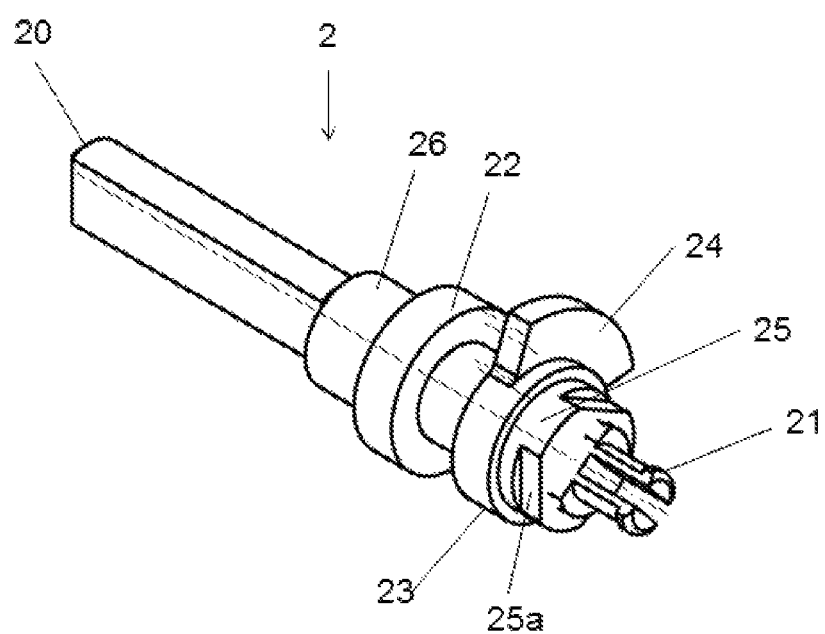
FIG. 7 is a perspective view of the shaft of the electronic thermostat of FIG. 1.

The shaft 2 of this embodiment is shown in detail in FIG. 7. Like the support 5, the shaft 2 is preferably made of a plastic material, more preferably polyamide.

In this embodiment, the shaft 2 comprises a stop ring 22 after the side wall 51a, the stop ring 22 being adjacent to side wall 51a. This stop ring 22 prevents axial movement of the shaft 2 when pulling on the knob coupled to the end 20 of the shaft 2.

In this embodiment, the shaft 2 further comprises a stop ring 23 before the support wall 52, said stop ring 23 being adjacent to the support wall 52. Stop ring 23 prevents the axial movement of the shaft 2 when the knob coupled to the end 20 of the shaft 2 is pushed.

In this embodiment, the shaft 2 further comprises a cam 24 demarcating the path of the shaft 2. As mentioned above, the wheel 40 of the potentiometer 4 preferably has a maximum rotation of 260 degrees. The cam 24 is designed such that it assures that the user cannot turn the shaft more than the maximum rotation, which thereby prevents damaging the potentiometer 4.

In this embodiment, the shaft 2 further comprises a ring 26 housed in the hole 512 of the side wall 51a and a ring 25 housed in the hole 520 of the support wall 52. The ring 25 comprises a plurality of recesses 25a making the contact surface between the shaft 2 and the hole 520 smaller, thereby reducing the friction between the shaft 2 and the hole 520 of the support wall 52. The support wall 52 comprises a recess around the hole 520 on each of its faces for the same purpose, such that the depth of the hole 520 is less than the width of the support wall 52, thereby reducing the friction between shaft 2 and the hole 520.

The electronic thermostat 1 of this embodiment is assembled as described below. First, the potentiometer 4 is fixed to the electronic board 3 and the electronic board 3 is then fixed to the support 5 by means of the flanges 501 of the base 50. The shaft 2 is then introduced in the hole 520 of the support wall 52 from the front part of the electronic thermostat 1, with an inclination, preferably of 45 degrees, with respect to the base 50 so that the different rings 22, 23 and 24 of the shaft and the cam 24 can overcome the hole of the side wall 51. Once the shaft 2 is in place, i.e., once the ring 25 is housed in the hole 520 of the support wall 52 and the ring 26 is in the side wall structure 51, the metal reinforcement 511 is introduced in the housing 510 of the side wall structure 51.

In this embodiment, the electronic thermostat 1 comprises a temperature sensor, not shown in the drawings, for measuring the oven temperature. The electronic board 3 comprises a controller, not shown in the drawings, which compares the temperature measured with said sensor and the set point temperature defined by the user with the rotary knob and decides, depending on the comparison, whether to connect or disconnect the different oven heating means. The type of sensor used is preferably a NTC or PTC sensor.

To improve the control of the oven in which the electronic thermostat is arranged, specifically to perform an algorithm suitable for improving the power consumption of the oven, the controller of the electronic thermostat can comprise an input signal with information about the oven operating mode chosen by the user. Depending on the chosen operating mode, the user will know which of the heating elements of the oven must be activated and, if the oven has a fan, the state of said fan. Depending on the operating mode and by taking into account the temperature set point introduced by the user, the controller can therefore apply a control algorithm which minimizes the power consumption of the oven.

What is claimed is:

1. An electronic thermostat for an oven, comprising:
   a support having a base, a side wall extending from the base and a support wall extending from the base, the side wall and support wall being arranged parallel to one another and spaced-apart from one another, the support wall having a first side facing the side wall and a second side opposite the first side with there being a through hole extending between the first and second sides;
   an electronic board located on the second side of the support wall and being held on the base of the support;
   a potentiometer being located on the second side of the support wall and being electronically coupled to or comprised in the electronic board, the potentiometer including a rotatable wheel; and
   a shaft rotatable about an axis with a first end suitable for being coupled to a rotary knob and a second end coupled to the rotatable wheel of the potentiometer, the rotatable shaft including a first stop ring located adjacent the side wall and a second stop ring located adjacent the first side of the support wall, the first stop ring being arranged adjacent to the side wall and the second stop ring being located adjacent the first side of the support wall in a manner that prevents movement of the shaft in an axial direction when the rotatable shaft is pulled or pushed, at least a portion of the rotatable shaft passing through the through hole of the support wall.

2. The electronic thermostat according to claim 1, wherein the side wall is comprised in a side wall structure that comprises a housing in which a metal reinforcement is arranged, such that the side wall and the metal reinforcement demarcate a hole with the rotatable shaft passing through the hole.

3. The electronic thermostat according to claim 2, wherein the metal reinforcement comprises threaded fixing holes for fixing the electronic thermostat to the oven, the side wall comprising fixing holes aligned with the threaded fixing holes of the metal reinforcement.

4. The electronic thermostat according to claim 2, wherein the metal reinforcement includes a first side end and a second side end, the housing including a first side groove in which resides the first side end and a second side groove in which resides the second side end.

5. The electronic thermostat according to claim 1, wherein the rotatable shaft comprises a cam that limits the amount by which the rotatable shaft is able to rotate.

6. The electronic thermostat according to claim 1, wherein the base comprises a plurality of through holes over which the electronic board is located, the plurality of through holes allowing a passage of air for cooling the electronic board.

7. The electronic thermostat according to claim 1, wherein the base comprises a plurality of flanges that are used to retain the electronic board on the support.

8. The electronic thermostat according to claim 1, wherein the support is made of a plastic material.

9. The electronic thermostat according to claim 8, wherein the plastic material is a polyamide.

10. The electronic thermostat according to claim 1, wherein the rotatable shaft is made of a plastic material.

11. The electronic thermostat according to claim 10, wherein the plastic material is a polyamide.

12. The electronic thermostat according to claim 2, wherein the rotatable shaft further comprises a ring housed in the hole demarcated by the side wall and the metal reinforcement.

13. The electronic thermostat according to claim 12, wherein the first stop ring has a first diameter and the ring has a second diameter, the first diameter being greater than the second diameter.

14. The electronic thermostat according to claim 1, wherein at least a first portion of the second stop ring is located inside the through hole extending between the first and second sides of the support, the at least portion of the second stop ring comprising a plurality of recesses that function to reduce friction between the second stop ring and the through hole when the rotatable shaft is rotated.

15. The electronic thermostat according to claim 14, wherein the support wall has an area of reduced thickness that circumscribes the through hole for the purpose of reducing friction between the second stop ring and the through hole when the rotatable shaft is rotated.

16. The electronic thermostat according to claim 14, wherein at least a second portion of the second stop ring resides outside the through hole and abuts the first side of the support wall.

17. The electronic thermostat according to claim 5, wherein the cam is located on the rotatable shaft between the first and second stop rings.

18. A system comprising an electronic thermostat according to claim 1, wherein the rotatable shaft is capable of being rotated to modify a temperature set point, the system further comprising a temperature sensor for measuring the oven temperature and a controller suitable for comparing the temperature measured by the sensor and the temperature set point temperature and, depending on the comparison, defining a signal suitable for controlling one or more heating elements of the oven.

19. The system according to claim 18, wherein the controller is capable of receiving an input signal with information about an operating mode of the oven, the controller being configured to apply a control algorithm to minimize the power consumption of the one or more heating elements of the oven depending on the operating mode and by taking into account the temperature set point.

* * * * *